(No Model.) 6 Sheets—Sheet 1.

R. FLECK.
SAW SHARPENING MACHINE.

No. 545,064. Patented Aug. 27, 1895.

Witnesses.
B. S. Ober

Inventor:
Richard Fleck.
by
atty.

(No Model.)  6 Sheets—Sheet 4.
R. FLECK.
SAW SHARPENING MACHINE.

No. 545,064.  Patented Aug. 27, 1895.

Witnesses.
B. S. Ober
Henry Orth Jr.

Inventor.
Richard Fleck.

by Henry Orth
Atty.

(No Model.) 6 Sheets—Sheet 5.

R. FLECK.
SAW SHARPENING MACHINE.

No. 545,064. Patented Aug. 27, 1895.

Witnesses:

Inventor,
Richard Fleck.

(No Model.) 6 Sheets—Sheet 6.

R. FLECK.
SAW SHARPENING MACHINE.

No. 545,064. Patented Aug. 27, 1895.

Witnesses:
B. S. Ober
Henry Ott

Inventor:
Richard Fleck.
By Henry Ott

UNITED STATES PATENT OFFICE.

RICHARD FLECK, OF BERLIN, GERMANY.

SAW-SHARPENING MACHINE.

SPECIFICATION forming part of Letters Patent No. 545,064, dated August 27, 1895.

Application filed November 1, 1894. Serial No. 527,607. (No model.) Patented in Germany October 4, 1892, No. 69,675; in England January 25, 1893, No. 1,704, and in Denmark June 6, 1894, No. 3,947.

*To all whom it may concern:*

Be it known that I, RICHARD FLECK, a subject of the German Emperor, residing at 31 Chausséestrasse, Berlin, Germany, have invented certain new and useful Improvements in and Relating to Saw-Sharpening Machines, (for which I have obtained Letters Patent in Germany, No. 69,675, dated October 4, 1892; in Great Britain, No. 1,704, dated January 25, 1893, and in Denmark, No. 3,947, dated June 6, 1894;) and I do hereby declare the following to be a clear and exact description of the invention.

My invention has relation to saw-sharpening machines, its object being to provide the necessary means for sharpening the teeth without altering the pitch or rake thereof, and also to provide means whereby the face or the back of the teeth, or both, may be ground to a bevel, as will now be fully described, reference being had to the accompanying drawings, in which—

Figure 1:
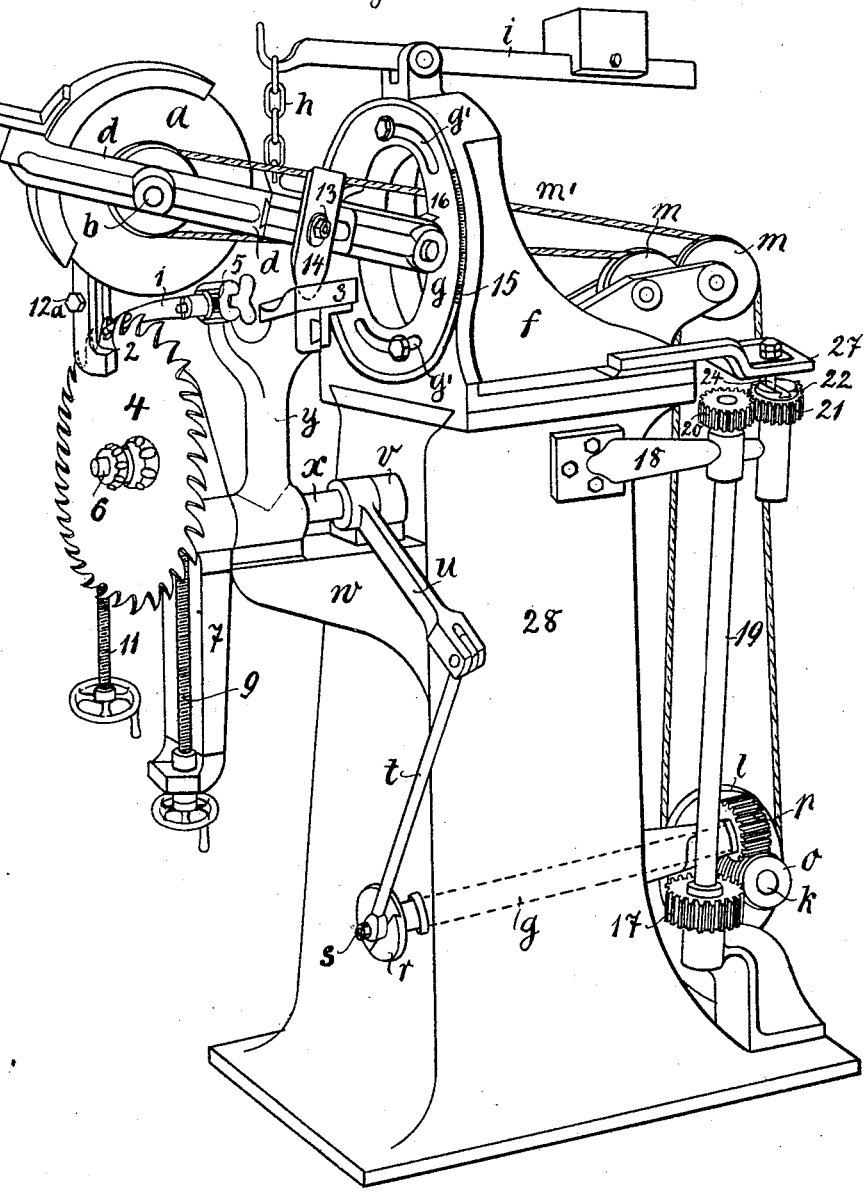
Figure 2:
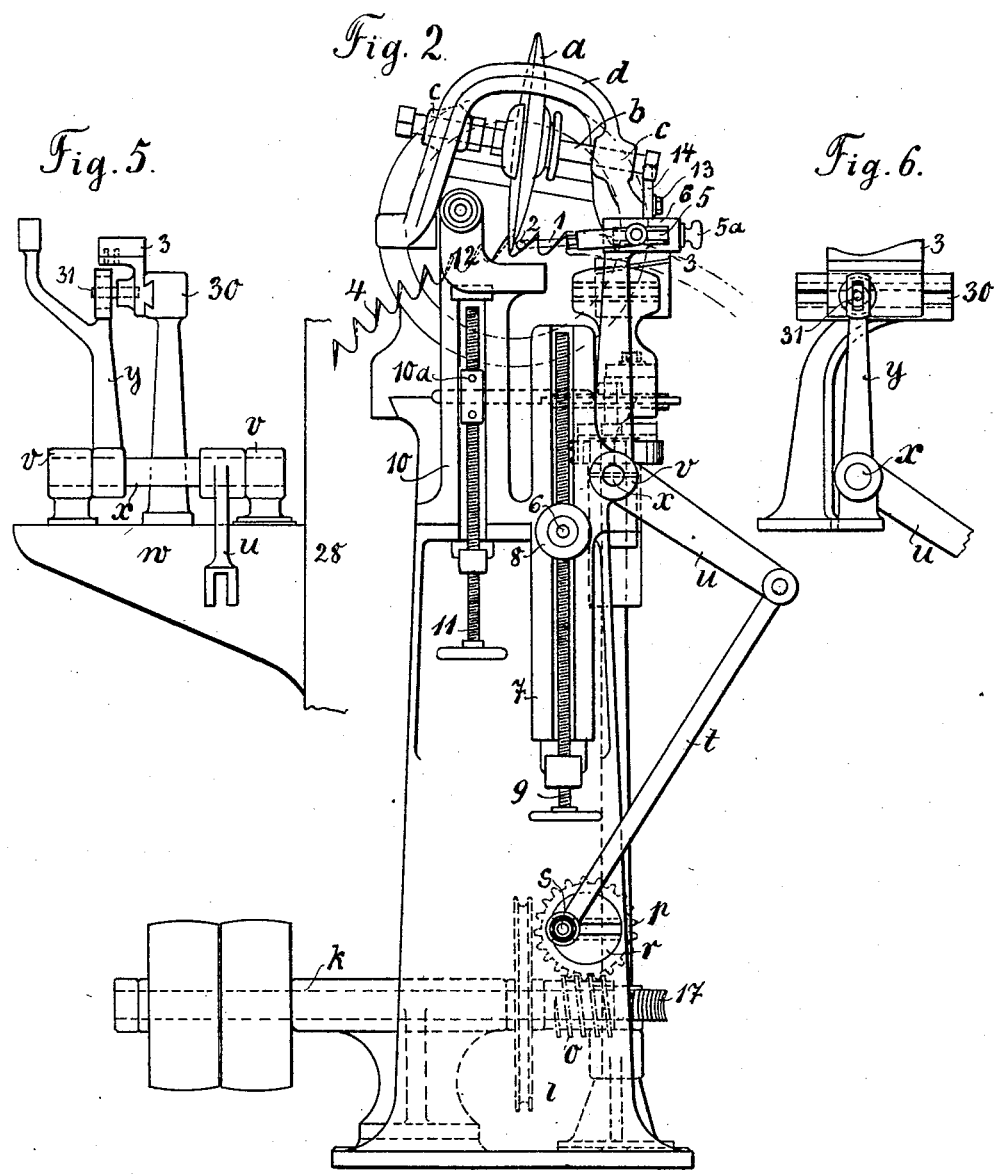

Figure 1 is a perspective view of a saw-sharpening machine embodying my invention, the grinding-wheel being shown lifted out of contact with the saw-teeth. Fig. 2 is a front elevation, Fig. 3 a side elevation, and Fig. 4 a top plan view, of said machine. Figs. 5 and 6 are detail views illustrating means for imparting a rectilinear motion to the templet, and Figs. 7 to 16 are diagrammatic views illustrative of the operations of the grinding-disk.

Similar letters and figures indicate like parts wherever such may occur in the described figures of drawings.

The operative mechanisms are supported from a suitable frame, a convenient form of such being shown in the drawings as consisting of a single upright or standard 28, the upper face of which serves as a guide-track on which the carriage $f$, that supports the grinding-disk $a$, has or may have a to-and-fro motion. On said standard 28 is formed or secured a console or bracket $w$, provided with bearings $v$ for a shaft $x$, and on said console are formed or secured vertical grooved guides 7 and 10, the grooves of said guides forming guideways for slide-blocks 8 and $10^a$, respectively, said blocks receiving motion from screw-spindles 9 and 11, respectively, that have bearing on their respective guides and work in screw-threaded openings in the blocks. The slide-block 8 has a journal 6, adapted to support a circular saw 4, held on said journal by a suitable nut and in such manner as to be capable of rotation. The slide-block $10^a$, Fig. 2, is adapted to support a straight grooved or clamping bar 29, Figs. 3 and 4, for a straight saw. By means of the described arrangement of slide-blocks and adjusting-screws circular saws of different diameters and straight saws of different widths can be properly positioned relatively to the grinding-disk and sharpened.

To the upper end of the guide 10 is connected a slotted guide 12, adapted to straddle the periphery of a circular saw at a point proximate to the tooth operated upon by the grinding-disk for the purpose of preventing lateral vibration of said saw during the operation of sharpening, and, if desired, the said guide 12 may perform the function of a clamp by increasing the length of the legs thereof and providing a clamping bolt or screw $12^a$, Fig. 1, for the purpose of clamping the saw more or less firmly without interfering with its rotation and for the purpose of adjusting the guide to saws of different thickness.

The standard 28 has an arm 18 in which are formed bearings for the upper end of a vertical shaft 19 and for a short spindle $21^a$, respectively. The lower end of shaft 19 is revoluble in a bearing at the foot of standard 28, as is also the driving-shaft $k$, which carries, besides the usual loose and fast pulleys, a grooved pulley $l$ and a worm or endless screw $o$, that meshes with a worm-gear 17 on shaft 19 and with a like gear $p$ on one end of a shaft $q$, having at its opposite end a crank-disk $r$, the wrist-pin $s$ of which is adjustable to and from the center of said disk in a radial groove formed therein, in a well-known manner, for the purpose of varying the amplitude of the oscillations of the shaft $x$ hereinbefore referred to, and consequently the amplitude of the vibrations of an arm $y$ keyed to said shaft, which latter is connected to the wrist-pin $s$ through the medium of an arm $u$ and a connecting-rod $t$. The free end of the radial arm $y$ is forked, and to the right-hand leg of the fork is secured a templet 3, while the left-hand leg of the fork terminates in a sleeve in which is fitted a slide 5, provided with a laterally-projecting pin serving as a pivot for a feed-arm 1, that has at its free end a push-pin 2, projecting laterally therefrom into the path of the saw-teeth, $5^a$ indicating the adjusting-screw and $5^b$ the binding-screw. (See Figs. 1, 2, and 3.) By means of the described arrangement the feed-arm 1 can be adjusted to feed saws having differently-spaced teeth, and it will readily be seen that when the arm $y$ is vibrated toward the left, Fig. 2, the push-pin 2 will move the saw, whether circular or straight, a distance equal to that between two teeth, and will ride over the back of a succeeding tooth and drop into the space between said tooth and that next succeeding when said arm $y$ is vibrated toward the right.

The shaft 19 carries at its upper end a gear 20, that meshes with a gear 21 on short spindle $21^a$, above referred to, and to said gear or to the spindle is secured a crank-disk 22, the wrist-pin 24 of which is also adjustable in a radial groove 23 of said disk to and from the center of the latter for the purpose of varying the amplitude of the reciprocating motion of the carriage $f$, which has a rearwardly-projecting and transversely-slotted arm 27, in whose slot is fitted a slide-block 25 connected with the wrist-pin 24, whereby a reciprocating motion is imparted to the aforesaid carriage $f$. In the head of the carriage $f$ is formed a circular opening, and in its front face said head has a circular bearing for a ring $g$ that supports the frame $d$ in which the grinding-disk $a$ is journaled, said ring having two or more slots $g'$ concentric with the axis of the ring, whereby and by means of set-screws or bolts $g^2$ said ring can be more or less turned in its bearing for the purpose of varying the angle of the grinding-disk $a$ relatively to the face and back of a saw-tooth, the head of the frame $f$ being provided with a graduated scale 15, and the ring with a pointer 16 for determining the angle to which the said grinding-disk is to be adjusted relatively to the inclination of the back of the saw-teeth. The frame $d$ is hinged to the ring $g$ at $e$, and in said frame is journaled the grinding-disk $a$, preferably on or in screw-bearings $b$, Fig. 4, for well-known purposes.

The arbor of disk $a$ carries a grooved pulley $b'$, around which and the pulley $l$ on driving-shaft $k$ passes the driving belt or cord $m'$, which is suitably guided by pulleys $m\,m$. The frame $d$ is connected by a chain $h$ or the like to one end of a weighted lever $i$, Figs. 1, 3, and 4, the weight on said lever being so adjusted as to be overbalanced by said frame in order that the grinding-disk $a$ may be automatically held in contact with the saw-teeth, and so that said frame may be lifted without great expenditure of power by a finger or arm 14, adjustable on the frame by means of a set-screw or bolt 13 extending through a slot in said finger, and by means of the templet 3, on the guide-face of which the finger has bearing, so that said frame $d$ is virtually supported by the templet during the operation of sharpening, and if the guide or pattern face of the templet is such that when the frame $d$ rises the grinding-disk will move in a plane corresponding with the plane of the face of the teeth, the rake of the latter will be automatically preserved.

I have described mechanism adapted to impart to the templet 3 a vibratory motion in an arc of a circle having for center the axis of rotation of shaft $x$. It will, however, be understood that a rectilinear motion may be imparted to said templet, as shown in Figs. 5 and 6. To this end I provide a standard 30, having formed therein a guide-groove for a slide-block to which said templet is secured, a pin 21 on the templet projecting into a suitable slot formed in the upper end of the right-hand leg of the fork on arm $y$. It is obvious that when said arm $y$ is vibrated a reciprocating motion will be imparted to the templet.

Figure 3:
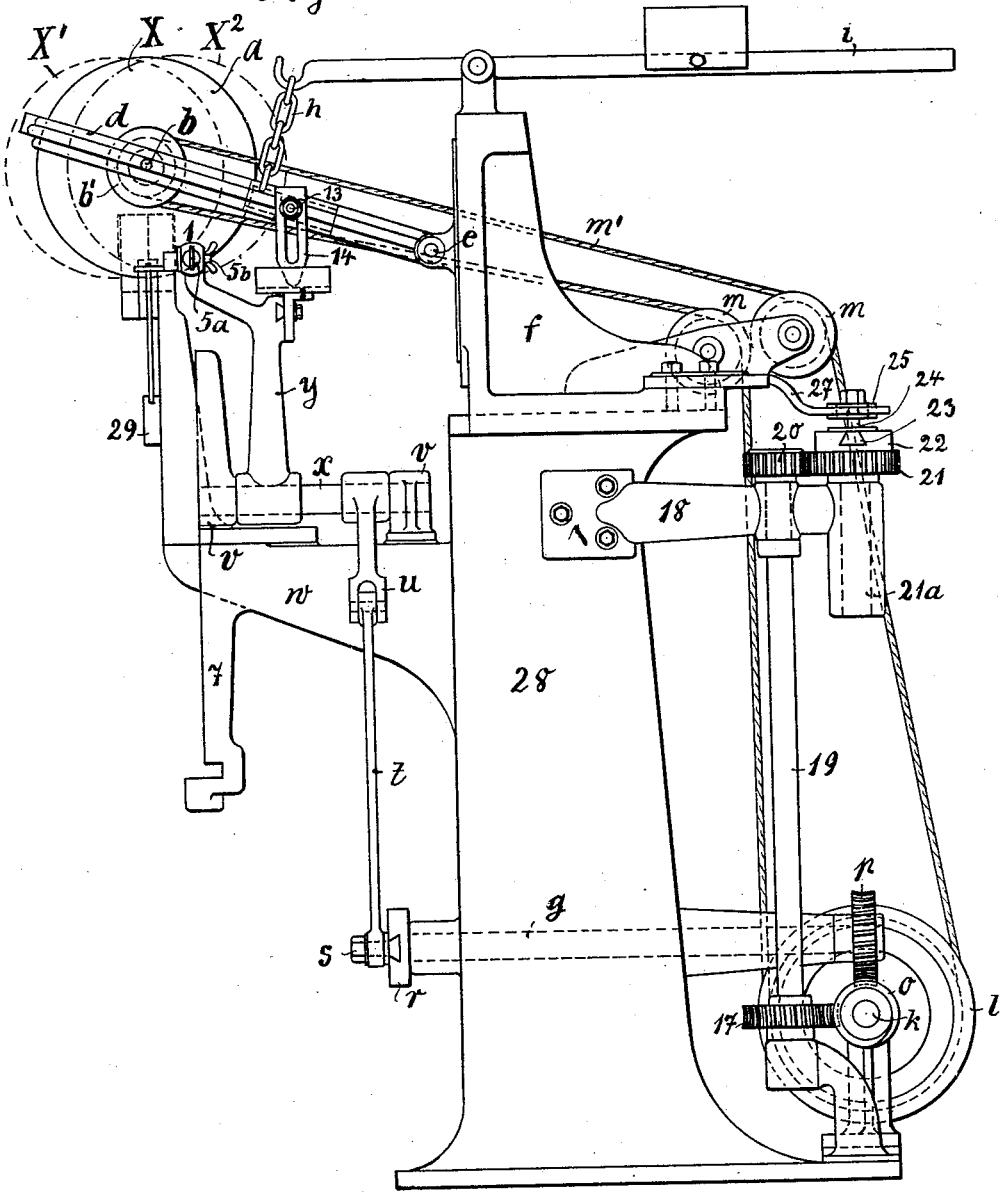
Figure 4:
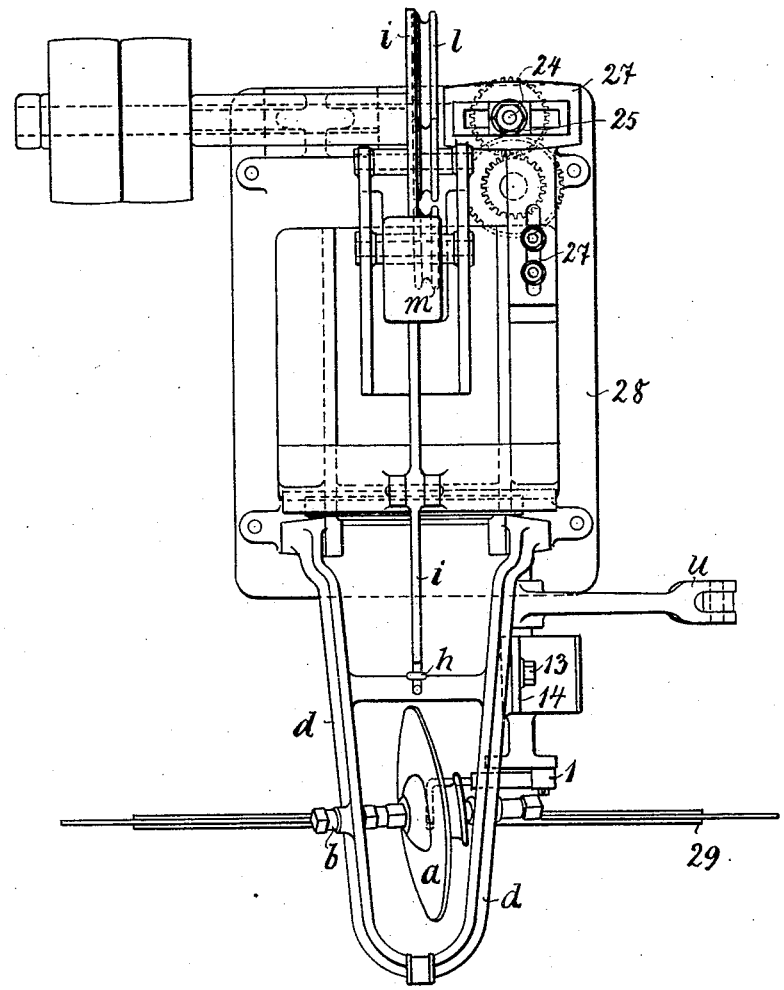

The operation of the machine is as follows, reference being also had to Figs. 7 to 16, it being assumed that a circular saw is to be sharpened; that a suitable templet is provided; that said saw and the feed-arm are properly adjusted and the operative devices set in motion; that the grinding-disk $a$, which, as shown in Figs. 2 and 4 and 7 to 10, has a beveled periphery, is about to reach the highest point of its upward motion under the guidance of the templet 3, moving toward the left; that the wrist-pin 24 is adjusted in the plane of the axis of rotation of spindle $21^a$, so that the frame $f$ will remain stationary in its mean position, the disk $a$ also occupying its mean position $x$, Fig. 3, with its center in the plane of the saw. Finally, it is assumed that the disk-frame $d$ has motion in a plane C D, Figs. 7 to 9, perpendicular to the axis of rotation of the saw.

Figure 7:
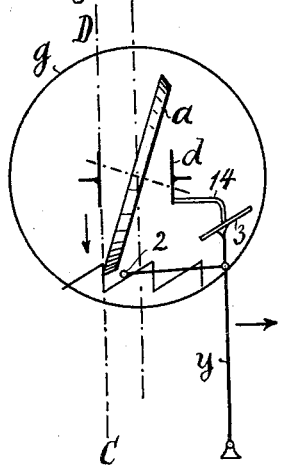
Figure 8:
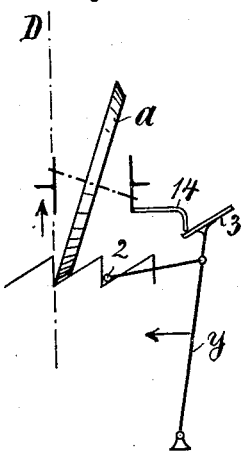

As the lever or arm $y$ continues to move in the direction of arrow, Fig. 7, the disk $a$ continues to descend, while the push-pin 2 on feed-arm 1 glides over the back of the next tooth and finally drops in front thereof, at which time the said arm $y$ has reached the limit of its vibratory motion toward the right and the disk $a$ the limit of its downward motion, Fig. 8. The arm $y$ now commences to move in the direction of arrow, Fig. 8, or toward the left, the push-pin 2 revolving the saw in the same direction, thereby moving the back of the saw-tooth in contact with the beveled face of said disk $a$, which latter moves in the plane of the rake of the tooth, Fig. 9, under the action of the templet 3, until the point of said tooth has moved clear of the disk, when the arm $y$ will have reached the limit of its vibratory movement toward the left. The saw will now remain stationary, and the arm $y$ will again move toward the right, allowing the disk to move downward along the face of the saw-tooth, the push-pin 2 moving along the back of the next succeeding tooth, and so on.

Figure 9:
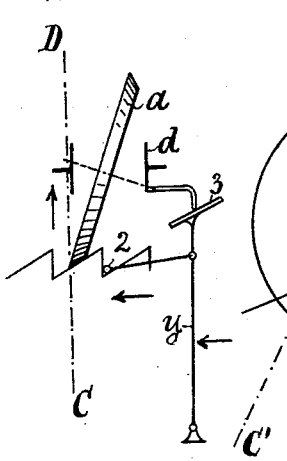
Figure 10:
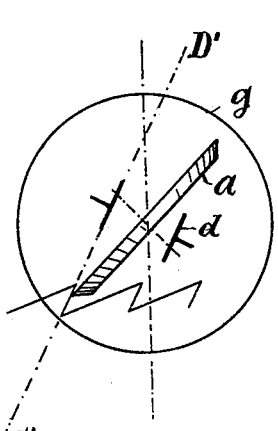

In Fig. 10 I have illustrated the adjustment of the grinding-disk $a$ by the means hereinabove described to a saw-tooth having a different inclination from that shown in Figs. 7, 8, and 9, the operation of sharpening being exactly the same; but here the disk-frame $d$ has motion in a plane $C'D'$ at an angle to the vertical diametral line of the saw. In all cases the axis of rotation of the grinding-disk is normally inclined from a horizontal in order that the edge of said disk may operate upon the face of the tooth and the bevel upon the back thereof, as shown in said Figs. 7 to 10 and also in Figs. 1 to 4. If it is desired to grind the back of the teeth to a bevel, the wrist-pin 24 of crank-disk 23 is adjusted to impart to the carriage $f$ the required amplitude of reciprocation.

Figure 11:
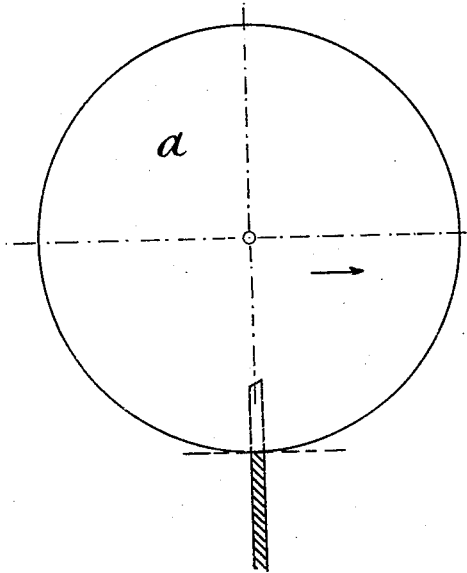
Figure 12:
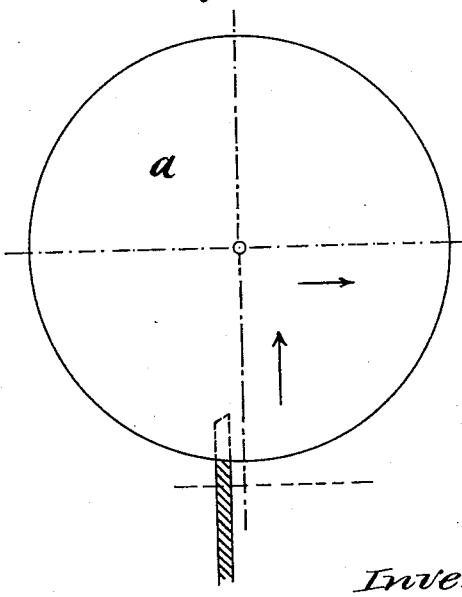
Figure 13:
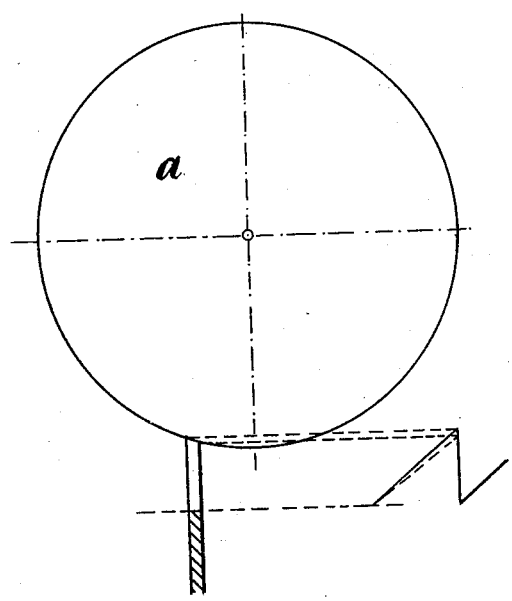
Figure 14:
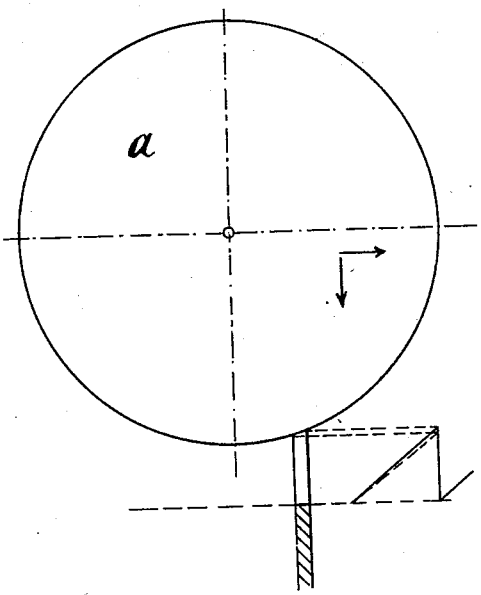
Figure 15:
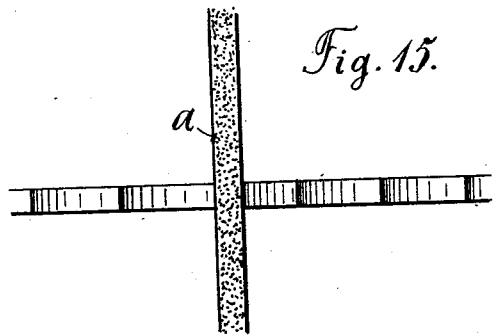
Figure 16:
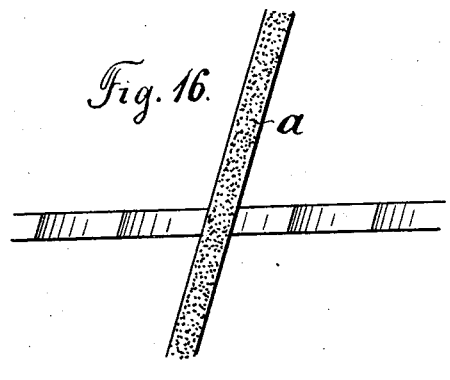

Fig. 11 shows the grinding-disk $a$ in its lowermost position, corresponding with that shown in Fig. 8, the axis of the disk lying in the plane of the saw, as in said Fig. 8. If carriage $f$ is now moved backward, (or toward the right, Fig. 3,) while the disk-frame is gradually lifted and the saw revolved by the feeding device, as described, that portion of the periphery of the grinding-disk lying immediately below its center will not operate upon the back of the saw-tooth, but a portion thereof lying eccentric to or outside of the vertical diametral line of the disk $a$, as shown in Fig. 12, forming an angle with said diametral line. In view of the fact that the base of the angle is an arc of a circle said angle will increase in proportion to the motion of the carriage $f$ or of disk $a$ from X to $X^2$, Fig. 3, or in proportion to the increase in the distance between the vertical diametral line of the disk and the plane of the saw, so that the bevel on the tooth also increases in proportion to the rise of the disk $a$ and receives substantially the form shown in Fig. 13, the operative mechanisms being so timed that during the return movement of the disk $a$ from $X^2$ to X, Fig. 3, the saw remains stationary, the disk operating upon the face of a tooth. As soon as the face of a tooth has been operated upon the carriage $f$ moves forward, (or toward the left, Fig. 3,) the disk moving from X to X', during which motion the back of a succeeding tooth is beveled in an opposite direction, or from right to left, as shown in Fig. 14, after which the disk $a$ returns to its normal or mean position X and thence again to X', and so on. If the face of the teeth are to be ground perpendicular to the plane of the saw, the grinding-disk $a$ will be adjusted to the position shown in Fig. 15; but if it is desired to bevel said face the said disk is adjusted as shown in Fig. 16, as will be readily understood. When all the teeth have been sharpened the operative mechanism is stopped and the saw removed. This stoppage is, however, not necessary when straight saws are sharpened, in view of the fact that as soon as the last tooth of such a saw has been sharpened it can be moved out of its support 29 and another saw inserted, so that the front tooth thereof will be first operated upon.

The described mechanism has many advantages, the most important of which are the simplicity of the operative mechanisms, requiring but little power to drive the same, the speed at which a saw can be sharpened, the absolute uniformity of the rake of the teeth, no matter how they are sharpened, and the facilities for beveling both back and face of the saw-teeth.

Having thus described my invention, what I claim as new therein, and desire to secure by Letters Patent, is—

1. In a saw sharpening machine, a saw support, a revoluble grinding disk and a support therefor adapted to move to and fro and to rise and fall, in combination with a templet adapted to vibrate in a plane at right angles to the plane of to and fro motion of the disk support and to control the rising and falling motion thereof, for the purpose set forth.

2. In a saw sharpening machine, a saw support, a revoluble grinding disk and a support therefor adapted to move to and fro, rise and fall and revolve about a horizontal axis, in combination with a templet adapted to vibrate in a plane at right angles to the plane of to and fro motion of the disk support and to control the rising and falling motion thereof, and a locking device for locking said disk support against rotation on its horizontal axis, for the purpose set forth.

3. In a saw sharpening machine, a saw support, a revoluble grinding disk and a support therefor adapted to move to and fro and rise and fall, in combination with a templet adapted to vibrate in a plane at right angles to the plane of to and fro motion of the disk support and to control the rising and falling motion thereof, and a saw feeding device adapted to vibrate synchronously with the templet, for the purpose set forth.

4. In a saw sharpening machine, a saw support, a revoluble grinding disk and a support therefor adapted to move to and fro in a horizontal and in a vertical plane, in combination with a saw feeding device and a templet adapted to vibrate in a plane at right angles to the plane of horizontal to and fro motion of the disk support, and to control the rising and falling motion thereof and the feed motion of the saw feeding device, for the purpose set forth.

5. In a saw sharpening machine, a support for the saw, a grinding disk, a support therefor having a to and fro motion in vertical and horizontal planes, in combination with a templet, a support therefor adapted to vibrate in a plane at right angles to the horizontal plane of motion of the disk support, and a feed dog adapted to move the saw a distance of one tooth at a time, said dog pivotally connected with the templet support, for the purpose set forth.

6. In a saw sharpening machine, a support for the saw, a grinding disk, a support therefor having a to and fro motion in vertical and horizontal planes, in combination with a templet, a support therefor adapted to vibrate in a plane at right angles to the horizontal plane of motion of the disk support, and a feed dog adapted to move the saw a distance of one tooth at a time, said dog pivotally connected with the templet support, and means for regulating the amplitude of the vibrations of the templet support, for the purpose set forth.

7. In a saw sharpening machine, the combination with a revoluble grinding disk, of the grooved guide standards 7 and 10, the saw supports 8 and 10ª, the adjusting spindles 9 and 11, and the saw guide 12 connected with guide standard 10 at its upper end said parts arranged relatively to the grinding disk, substantially as set forth.

8. In a saw sharpening machine, the combination with the saw support, the carriage $f$, a grinding disk, a support therefor, articulated to said carriage and provided with a depending arm 14, and mechanism for imparting a to and fro motion to the carriage and a rotary motion to the grinding disk, of the templet 3 on which the aforesaid arm 14 has bearing, the bifurcated support $y$ thereof, the feed dog 1 pivotally connected with one of the arms of said support $y$, and means for imparting a vibrating motion to the support $y$ substantially as and for the purpose set forth.

9. In a saw sharpening machine, the combination with the saw support, the carriage $f$ provided with a circular bearing, an adjusting ring seated therein, a grinding disk, a support therefor articulated to said adjusting ring and provided with a depending arm 14, and mechanism for imparting a to and fro motion to the carriage and a rotary motion to the grinding disk, of a templet on which the arm 14 has bearing, a saw feeding device, and appliances for imparting synchronous to and fro motion to said templet and feeding device, substantially as and for the purpose set forth.

10. In a saw sharpening machine, a saw support, a revoluble grinding disk and a support therefor adapted to move to and fro and rise and fall, in combination with mechanism for varying the amplitude of the to and fro motion of said disk support, for the purpose set forth.

11. In a saw sharpening machine, a saw support, a revoluble grinding disk and a support therefor adapted to move to and fro and rise and fall, in combination with a templet adapted to vibrate in a plane at right angles to the plane of to and fro motion of the disk support and to control the rising and falling motion thereof, and regulating devices for regulating the amplitude of the to and fro motion of the disk support and the amplitude of vibration of the templet, substantially as and for the purpose set forth.

12. In a saw sharpening machine, a saw support, a revoluble grinding disk and a support therefor adapted to move to and fro and rise and fall, in combination with a templet adapted to vibrate in a plane at right angles to the plane of to and fro motion of the disk support and to control the rising and falling motion thereof, a saw feeding device adapted to vibrate synchronously with said templet, and adjusting devices for adjusting the amplitude of the to and fro motion of the aforesaid disk support and the vibrating motion of the templet, and saw feeding device, substantially as and for the purpose set forth.

In testimony that I claim the foregoing as my invention I have hereto signed my name in presence of two witnesses.

RICHARD FLECK.

Witnesses:
RICHARD SCHMIDT,
LOUIS RICHTER.